(12) United States Patent
Haenggi et al.

(10) Patent No.: US 8,144,903 B2
(45) Date of Patent: Mar. 27, 2012

(54) WIRELESS COMMUNICATION SYSTEM

(75) Inventors: Stefan Haenggi, Bern (CH); Francois Marquis, Corminboeuf (CH); Rainer Platz, Colombier (CH)

(73) Assignee: Phonak AG, Staefa (CH)

( * ) Notice: Subject to any disclaimer, the term of this patent is extended or adjusted under 35 U.S.C. 154(b) by 181 days.

(21) Appl. No.: 12/520,707

(22) PCT Filed: Dec. 20, 2006

(86) PCT No.: PCT/EP2006/012347
§ 371 (c)(1),
(2), (4) Date: Jan. 18, 2010

(87) PCT Pub. No.: WO2008/074350
PCT Pub. Date: Jun. 26, 2008

(65) Prior Publication Data
US 2010/0135512 A1    Jun. 3, 2010

(51) Int. Cl.
*H04R 25/00* (2006.01)
(52) U.S. Cl. ........................................ 381/315; 381/312
(58) Field of Classification Search .................. 381/312, 381/315, 23.1; 455/3.01, 3.06
See application file for complete search history.

(56) References Cited

U.S. PATENT DOCUMENTS

| | | | |
|---|---|---|---|
| 8,019,386 B2 | 9/2011 | Dunn et al. | |
| 2005/0032539 A1 | 2/2005 | Noel et al. | |
| 2005/0135297 A1 | 6/2005 | Katayama | |
| 2006/0274747 A1 | 12/2006 | Duchscher et al. | |
| 2006/0291680 A1* | 12/2006 | Roeck | 381/315 |
| 2007/0009124 A1 | 1/2007 | Larsen | |

FOREIGN PATENT DOCUMENTS

| | | |
|---|---|---|
| EP | 0 778 680 A1 | 6/1997 |
| EP | 1 619 863 A1 | 1/2006 |
| EP | 1 638 367 A2 | 3/2006 |
| EP | 1 640 972 A1 | 3/2006 |
| EP | 1 643 801 A2 | 4/2006 |
| EP | 1 657 958 A1 | 5/2006 |
| EP | 1 198 802 B1 | 9/2008 |
| JP | 2004-274677 A | 9/2004 |
| WO | 02/23948 A1 | 3/2002 |
| WO | 2004/110099 A3 | 12/2004 |

OTHER PUBLICATIONS

European Search Report Dated Dec. 15, 2011 Corresponds to Application No. EP 11 18 3956.

* cited by examiner

*Primary Examiner* — Tuan Nguyen
(74) *Attorney, Agent, or Firm* — Roberts Mlotkowski Safran & Cole, P.C.; David S. Safran

(57) ABSTRACT

A communication system having at least one user worn receiver unit for receiving audio signals via a wireless audio link connected to a stimulating means for stimulating the user's hearing according to audio signals received via the audio link; and a plurality of user worn transmission units and a microphone arrangement for capturing audio signals from the respective user's voice, an audio signal transmission portion for establishing the wireless audio link to at least one receiver unit to transmit the captured audio signals to the at least one receiver unit, an assistive digital link transceiver portion for establishing a bidirectional assistive digital link to at least one of the other transmission units and/or to an external command unit, and a control unit for controlling signal transmission of the transmission unit according to data exchanged with the control unit of the at least one of the other transmission units and/or the external command unit.

24 Claims, 5 Drawing Sheets

WIRELESS COMMUNICATION SYSTEM

BACKGROUND OF THE INVENTION

1. Field of the Invention

The present invention relates to a communication system comprising at least one receiver unit to be worn by a user for receiving audio signals via a wireless audio link and a plurality of transmission units each adapted to be worn by a user and comprising a microphone arrangement for capturing audio signals from the respective user's voice, which can be transmitted to the receiver unit(s).

2. Description of Related Art

Usually in such systems, wherein the receiver unit usually is worn at ear-level, the wireless audio link is an FM radio link. The benefit of such systems is that sound captured by a remote microphone at the transmission unit can be presented at a high sound pressure level to the hearing of the user wearing the receiver unit at his ear(s).

According to one typical application of such wireless audio systems, the stimulating means is a loudspeaker which is part of the receiver unit or is connected thereto. Such systems are particularly helpful for being used in teaching e.g. (a) normal-hearing children suffering from auditory processing disorders (APD), (b) children suffering a unilateral loss (one dead ear), or (c) children with a mild hearing loss, wherein the teacher's voice is captured by the microphone of the transmission unit, and the corresponding audio signals are transmitted to and reproduced by the receiver unit worn by the child, so that the teacher's voice can be heard by the child at an enhanced level, in particular with respect to the background noise level prevailing in the classroom. It is well known that presentation of the teacher's voice at such enhanced level supports the child in listening to the teacher.

According to another typical application of wireless audio systems the receiver unit is connected to or integrated into a hearing instrument, such as a hearing aid. The benefit of such systems is that the microphone of the hearing instrument can be supplemented or replaced by the remote microphone which produces audio signals which are transmitted wirelessly to the FM receiver and thus to the hearing instrument. FM systems have been standard equipment for children with hearing loss (wearing hearing aids) and deaf children (implanted with a cochlear implant) in educational settings for many years.

Hearing impaired adults are also increasingly using FM systems. They typically use a sophisticated transmitter which can (a) be pointed to the audiosource of interest (in e.g. cocktail parties, (b) put on a table (e.g. in a restaurant or a business meeting), or (c) put around the neck of a partner/speaker and receivers that are connected to or integrated into the hearing aids. Some transmitters even have an integrated Bluetooth module given the hearing impaired adult the possibility to connect wirelessly with devices such as cell phones, laptops etc.

The merit of wireless audio systems lies in the fact that a microphone placed a few inches from the mouth of a person speaking receives speech at a much higher level than one placed several feet away. This increase in speech level corresponds to an increase in signal-to-noise ratio (SNR) due to the direct wireless connection to the listener's amplification system. The resulting improvements of signal level and SNR in the listener's ear are recognized as the primary benefits of FM radio systems, as hearing-impaired individuals are at a significant disadvantage when processing signals with a poor acoustical SNR.

International Patent Application Publication WO 02/23948 A1 relates to a communication system comprising an FM receiver for a hearing aid, wherein audio signals may be transmitted from a plurality of transmitters via an analog FM audio link and wherein in addition the transmitters may transmit configuration parameters for adjusting the FM receiver via a separate digital control channel which may use FSK (Frequency Shift Keying) modulation.

European Patent Application EP 1 638 367 A2 relates to a communication system comprising an FM receiver unit for a hearing aid and a transmission unit comprising a microphone arrangement for capturing audio signals from a user's voice. The audio signals are transmitted from the transmission unit to the receiver unit via an analog FM audio link. In addition to the audio link a bidirectional digital link is provided between the transmission unit and the receiver unit for polling status information regarding the status of the receiver unit by the transmission unit.

European Patent Application EP 1 657 958 A1 relates to a communication system comprising a plurality of hearing devices which may communicate among each other via a wireless link which may be analog or digital.

Usually analog audio FM receivers are highly optimized for low power consumption and small size. However, due to the analog nature of this wireless link, multi-transmit structures are so far not possible within such systems.

SUMMARY OF THE INVENTION

It is an object of the invention to provide for a communication system wherein audio signals captured by the microphones of a plurality of transmission units are transmitted to at least one receiver unit via a wireless audio link, while the system should be particularly flexible and easy to use.

The invention is beneficial in that, by combining a conventional wireless audio link with an assistive digital link for controlling audio signal transmission via the analog audio link, the flexibility and the use comfort of conventional audio transmission systems can be significantly enhanced.

In particular, if the audio link is an analog audio link, such as an FM or IR (infrared) link, the advantages of analog audio links such as the very low power requirements, the lack of interference, the lack of audio delay and the large implemented consumer base, can be combined with the advantages of digital wireless links, such as the reliable data exchange, the bidirectional communication and the possibility to create configurable networks. In particular, while the benefits of the analog audio link can be essentially maintained, a relatively simple multi-user network can be established, wherein the issue of which user's voice is presently to be transmitted via the analog audio link to the receiver unit can be addressed in a manner which is very comfortable to the users.

In some applications, the audio link may be a digital link rather than an analog link. In this case the assistive digital link of the invention may serve to overcome range or bandwidth limitations of the digital audio link.

According to one embodiment, each transmission unit has an audio transmission portion, with the assistive digital link (ADL) being used to control which of the transmission units is presently allowed to transmit via the audio link. According to another feature of the invention, only a part of the transmission units (usually only a single one) is equipped with an audio transmission portion, while the audio signals captured by the microphone arrangement of one of the other transmission units is supplied via the assistive digital link to the (or one of the) audio transmission portion for being transmitted from there via the audio link to the receiver unit(s).

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
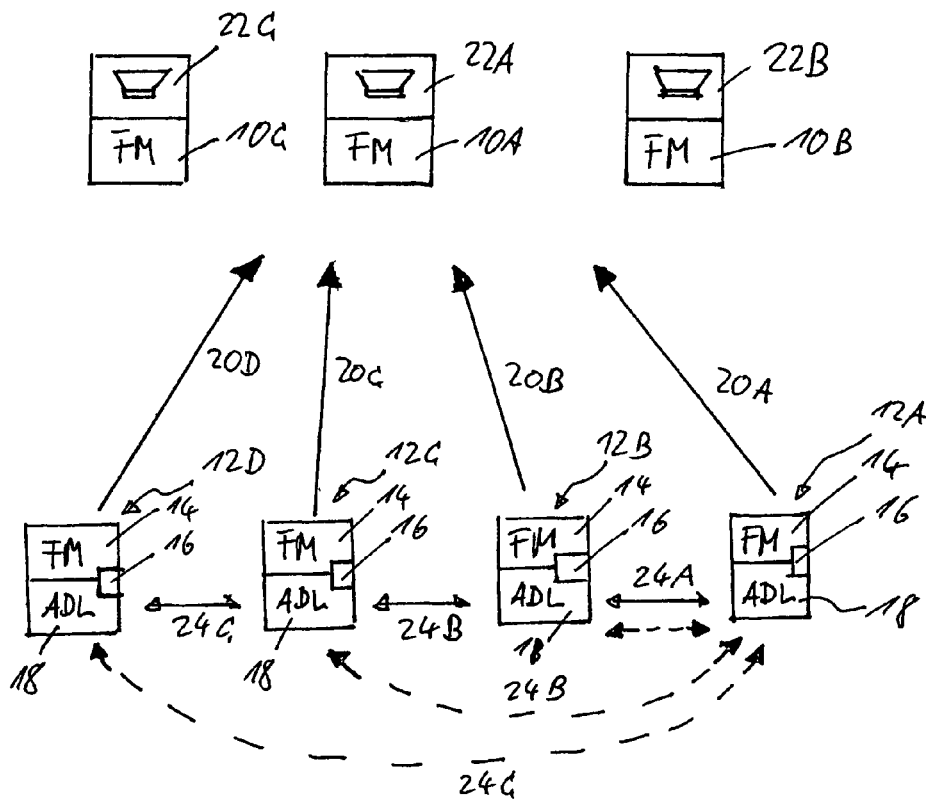
FIG. 1 is a schematic block diagram of an example of the architecture of a communication system according to the invention.

The communication system of FIG. 1 comprises at least one receiver unit 10A and a plurality of transmission units 12A, 12B, 12C and 12D. Each transmission unit 12A, 12B, 12C and 12D comprises an analog transmission portion 14, a microphone arrangement 16 and a digital transceiver portion 18. The microphone arrangement 16, which usually comprises two spaced apart microphones (see at 38A, 38B in FIG. 4) for enabling acoustic beam forming capability, is provided for capturing audio signals from the respective user of the transmission unit 12A, 12B, 12C and 12D, which audio signals may be transmitted by the analog transmission portion 14 via an analog wireless audio link 20A, 20B, 20C and 20D, respectively, to the receiver unit 10A.

The receiver 10A comprises or is connected to stimulating means 22A for stimulating the hearing of the user of the receiver unit 10A according to the audio signals received via the audio link 20A, 20B, 20C and 20D. The stimulating means 22A typically will be part of a hearing instrument, in particular a hearing aid, and usually it will be a loudspeaker. The receiver unit 10A may be integrated into such hearing instrument, or it may be connected to the hearing instrument, usually via a so-called "audio shoe". Usually the stimulating means 22A will be worn at least in part in the user's ear canal (for example, the loudspeaker may be worn in the ear canal, or a sound tube will be extending from the loudspeaker into the ear canal). The stimulating means 22A may be part of a BTE (Behind The Ear)-, ITE (In The Ear)- or CIC- (Completely In the Channel) hearing instrument. In the latter case, also the receiver unit 10A will be worn at least in part in the user's ear canal; otherwise it will be worn at the user's ear.

It is to be understood that usually one of the receiver units 10A will be provided for the right ear and one will be provided for the left ear.

The analog audio link 20A, 20B, 20C, 20D usually will be an FM link.

The communication system of FIG. 1 in addition to the receiver unit 10A, may comprise additional receiver units 10B, 10C, etc. which are to be used by other users. The analog audio links 20A, 20B, 20C, 20D will be used by these additional receiver units 10B, 10C in the same manner as by the receiver unit 10A.

The digital transceiver portions 18 serve to establish a bidirectional digital link 24A, 24B, 24C—assistive digital link (ADL)—to at least one of the other digital transmitter portions 18 for exchanging data between the transmission units 12A, 12B, 12C, 12D. This data may be used to control transmission of audio signals via the analog audio link 20A, 20B, 20C, 20D. Preferably audio signal transmission is controlled in such a manner that at a time only one of the transmission units 12A, 12B, 12C, 12D is allowed to transmit audio signals via the analog audio link 20A, 20B, 20C, 20D.

The transmission units 12A, 12B, 12C, 12D may designed to be worn around the respective user's neck or on the user's belt, etc.

Preferably, the digital link 24A, 24B, 24C, uses GFSK (Gaussian frequency-shift keying) as the modulation, and it may use frequency hopping for achieving reliable data transmission. Preferably, it may use the 2.45 GHz ISM band. Communication between the digital transmitter portions 18, which form a network, for example, may be organized according to a TDMA (time division multiple access) scheme.

Figure 4:
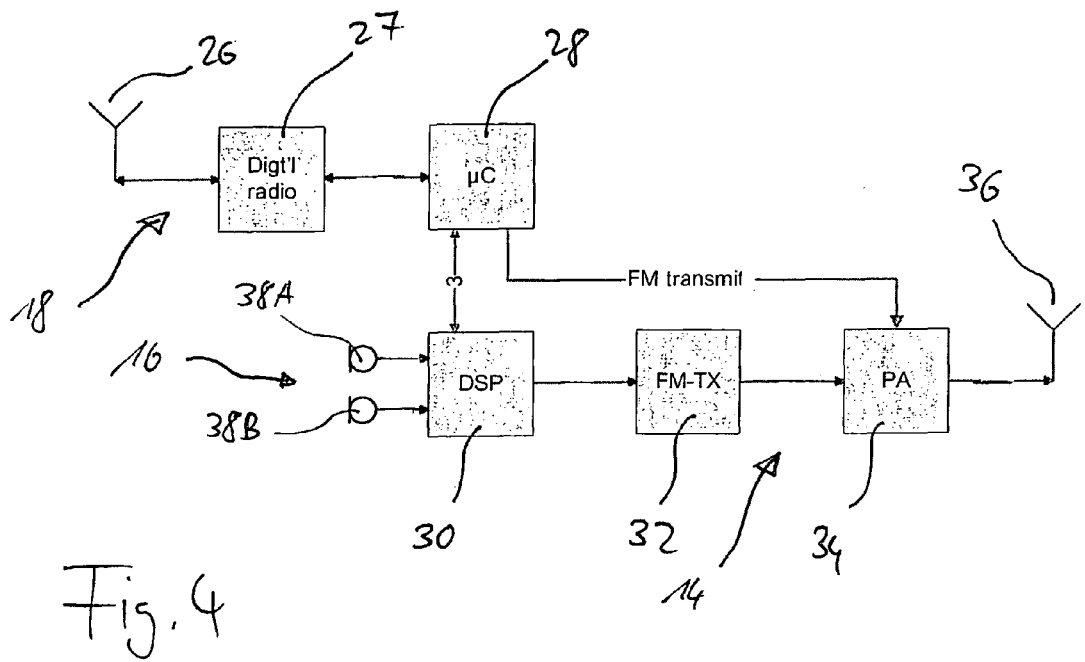
FIG. 4 is an example of a transmission unit to be used in the system of FIG. 1.

In FIG. 4 an example of a block diagram of an example of the transmission unit 12A (the transmission units 12B, 12C, 12D are identical) is shown, according to which an antenna 26, a digital transceiver 27, a control unit 28, an audio signal processing unit 30, an analog transmitter 32, a power amplifier 34, an antenna 36 and the microphone arrangement 16 comprising two spaced apart microphones 38A, 38B are provided. The antenna 26 and the digital transceiver 27 form the digital transceiver portion, whereas the analog transmitter 32, the power amplifier 34 and the antenna 36 form the analog transmission portion.

The audio signals captured by the microphones 38a, 38B are processed by the audio signal processing unit 30, and then they are supplied to the analog transmitter 32, from which the modulated audio signals are supplied to the analog antenna 38, after amplification by the power amplifier 34, in order to be transmitted via the analog audio link 20A. These elements correspond to the functionality of a conventional FM transmission unit. However, in the embodiment of FIG. 4 the amplifier 34 is controlled by the control unit 28, which exchanges data with the other transmission units 12B, 12C, 12D via the digital transceiver portion 27. Further, the control unit 28 communicates with the audio signal processing unit 30. Usually the audio signal processing unit 30 will include a voice activity detector in order to detect the time periods when the user of the transmission unit 12A is speaking.

When the voice activity detector has detected that the user is presently speaking, a request for being allowed to transmit via the analog audio link 20A, i.e. a request for the "right to transmit" is transmitted from the control unit 28 via the digital transceiver portion 18.

Preferably the communication protocol of the digital link 24A, 24B, 24C is such that one of the transmission units, for example, the transmission unit 12A, is the master, whereas the other transmission units, for example, 12B, 12C and 12D are the slaves. In this case the master decides which one of the transmission units 12A, 12B, 12C, 12D is allowed to transmit via the analog audio link 20A, 20B, 20C and 20D, respectively. To this end, the master control unit 28 will transmit corresponding commands via the digital link to the slave control units 28. Unless the respective slave control unit 28 receives such an "FM enable" command, the control unit 28 will keep the power amplifier 34 turned-off, thereby preventing analog audio signal transmission.

Since it may happen that two or more users are speaking at the same time, it is necessary to define priority rules. One example of such a priority rule may be a "first come" principle, wherein once a certain one of the transmission units has been enabled to transmit via the analog audio link, it will be allowed to continue until the respective user has stopped speaking, i.e. until the respective voice activity detector detects that the user has stopped speaking. During that time no other transmission unit will be allowed to transmit via the analog audio link. Alternatively, or in addition, each of the transmission units may be awarded a certain priority, with a transmission unit whose user is determined to presently speak is allowed to transmit via the analog audio link only if none of the other transmission units having the same or a higher priority has detected that the user of that transmission unit is presently speaking. For transmission units having the same priority, the "first come" principle will be applied.

Figure 6:
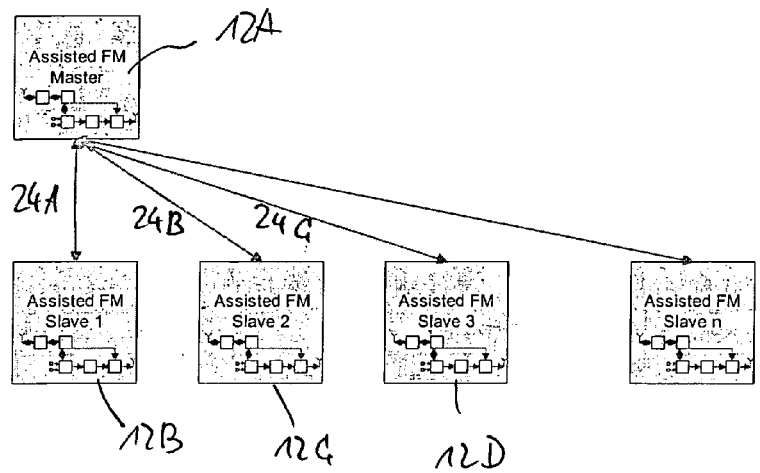
FIG. 6 is a view like FIG. 5, with an alternative embodiment being shown.

According to FIG. 6, the communication protocol of the digital link may be such that each slave control unit 28 communicates directly with the master control unit 28 via the digital link.

Figure 5:
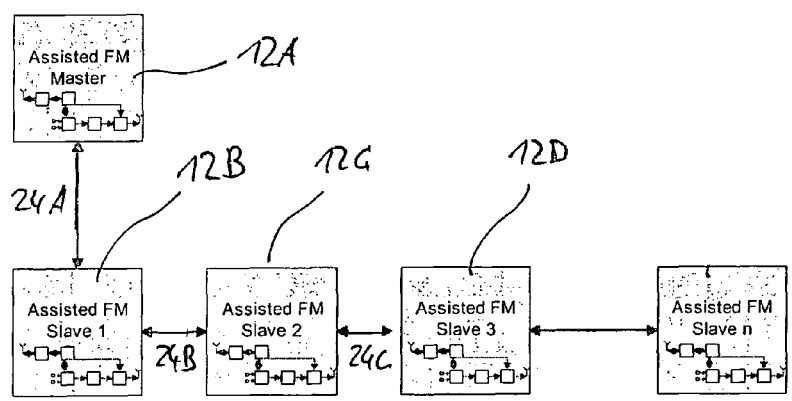
FIG. 5 is a block diagram of one example of how the transmission unit of FIG. 4 can be used in the system of FIG. 1.

An alternative scheme is shown in FIG. 5, according to which the communication protocol is such that the slave control units 28 communicate with at least one of the other slave control units 28 via the digital link in such a manner that each of those slave control units 28 which do not directly communicate with the master control unit 28 communicates with the master control unit via at least of the other slave control units 28.

Figure 2:
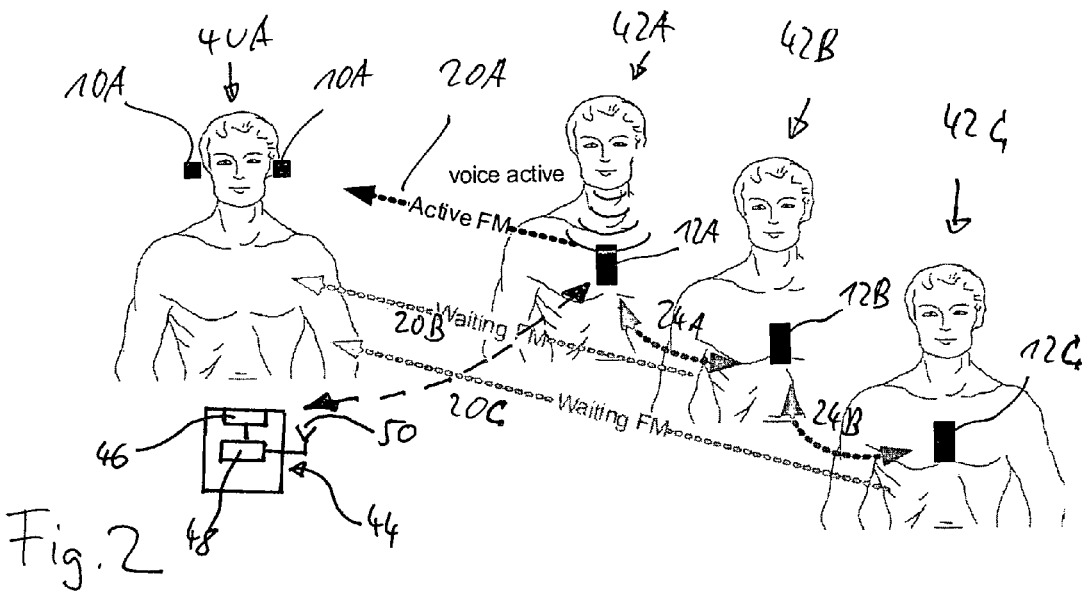
FIG. 2 is a schematic view of a first application example of the system of FIG. 1.

According to FIG. 2 the system of FIG. 1 is applied to a situation in which a user 40A of a hearing instrument comprising a receiver unit 10A communicates with other persons 42A, 42B, 42C, who are wearing a transmission unit 12A, 12B and 12C, respectively, in order to have their voices transmitted to the receiver unit 10A of the user 40A. The transmission units 12A, 12B, 12C are organized via the digital link 24A, 24B in such a manner that at a time only one of the transmission units 12A, 12B, 12C is allowed to transmit via the analog audio link. In the example shown in FIG. 2 the person 42A is speaking, so that his transmission unit 12A detects his voice and is allowed to transmit the audio signals captured by the microphones 38A, 38B of the transmission unit 12A via the analog audio link 20A. Hence, in this example only the analog audio link 20A from the transmission unit 12A is active, whereas the analog audio links 20B and 20C from the transmission unit 12B, 12C are deactivated and are in a "waiting" status.

As already discussed above, preferably the request for the "right to transmit" via the analog audio link is generated upon detection of the user's voice by a voice activity detector, which in a particularly favorable configuration requires the provision of two spaced apart microphones 38A, 38B at the transmission unit. In a simplified version, a single microphone input connected to an energy-based voice activity detection algorithm could be used. However, rather than creating the request for the "right to transmit" automatically, it is also conceivable that the person 42A, 42B, 42C who wants to speak generates the "right to transmit" request manually, for example, by pressing a button at the transmission unit. Priority handling, i.e. if two persons wish to speak at the same time, can be done in the same manner as described for the voice activity detection, i.e. according to predetermined priorities plus "first come" for same priority.

According to a further alternative, the hearing instrument user 40A may be provided with the option to select the person who he wants to hear. This can be done by providing him with a control box 44 comprising control elements 46, a digital transceiver 48 and an antenna 50. The control box 44 uses the same digital link ("ADL") which is used for data exchange between the transmission units 12A, 12B, 12C. By pressing the respective control element 46 the hearing instrument user 40A can activate the desired one of the transmission units 12A, 12B, 12C. To this end the control box 44 transmits a corresponding command via the digital link to the transmission units 12A, 12B, 12C, whereupon the selected one is allowed to transmit via the analog audio link. For example, the control elements 46 may comprise one button for each of the transmission units.

In general, by using the communication system in the manner shown in FIG. 2 a "virtual microphone" is created which is passed around between the persons 42A, 42B, 42C automatically and/or by interaction from the hearing instrument user 40A or the persons 42A, 42B, 42C. Such application is useful in group communication situations, for example, in a business meeting, in a car, in a restaurant, or at home.

If the hearing instrument user 40A uses one receiver unit 10A at each ear, it would be possible to use different analog transmission channels on each ear. For example, the voices of the person 42A, 42B, 42C could be provided to one ear in the manner described above, whereas a telephone call, in particular a conference call, could be provided to the other ear.

Figure 3:
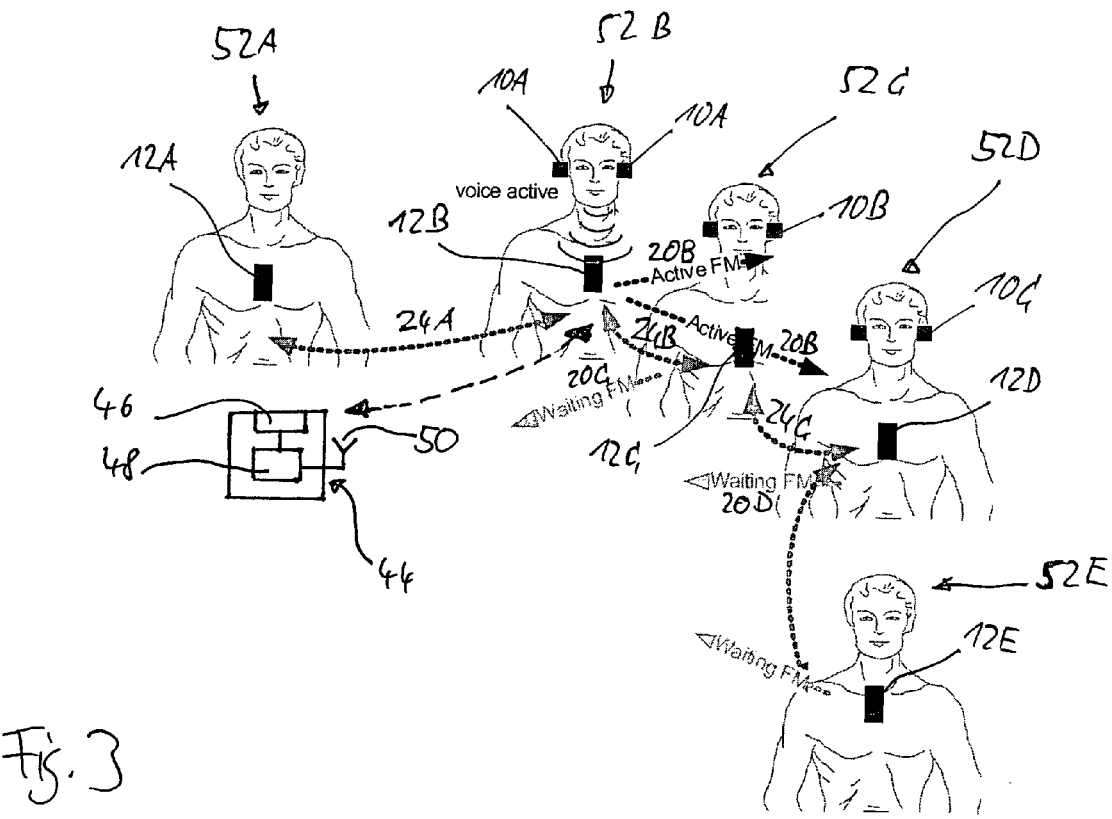
FIG. 3 is a view like FIG. 2, with a second application example of the system of FIG. 1 being shown.

In the example of FIG. 2 all users of the transmission units 12A, 12B, 12C are normal hearing persons. In FIG. 3 an example is shown in which some of the users of the transmission units are hearing impaired persons who wear a receiver unit.

A typical situation would be teaching in a specialized school for hearing impaired people. Traditionally, in such cases only the voice of the teacher 52A is broadcast via the analog audio link to the receiver units worn by the students, whereas the answers from the students could not be heard by the other students via the receiver units.

FIG. 3 shows an example of how this deficiency can be overcome by using a communication system according to the invention. Each of the students 52B, 52C, 52D, 52E is provided with a transmission unit 12B, 12C, 12D and 12E, respectively. The student 52E is normal hearing, whereas the students 52B, 52C and 52D are hearing impaired and therefore wear a receiver unit 10A, 10B and 10C, respectively. The audio signals captured by that transmission unit which has received the "right to transmit" will be transmitted via the analog audio link to all receiver units. The handling of the "right to transmit" in generally may be similar to that discussed with regard to the system shown in FIG. 2. However, usually the teacher 52A will be awarded the highest priority, i.e. if the teacher 52A speaks, his transmission unit 12A will always receive the "right to transmit" irrespective of whether another person is already speaking or wishes to speak.

As in the case of FIG. 2, a command unit 44 may be provided, which may be used by the teacher 52A to select which student's voice is to be transmitted via the analog audio link.

As mentioned already with regard to FIG. 2, if the users wear two receiver units, two different analog audio channels my be realized, for example, reception of the audio signals transmitted by the transmission units on one ear and audio signals from another audio source (telephone etc.) at the other ear. It is also conceivable that the hearing impaired students receive the teacher's voice always on one ear and the student's answers in the other ear, if one of the students is active. If no student is active, the teacher's voice may be received on both ears.

Figure 7:
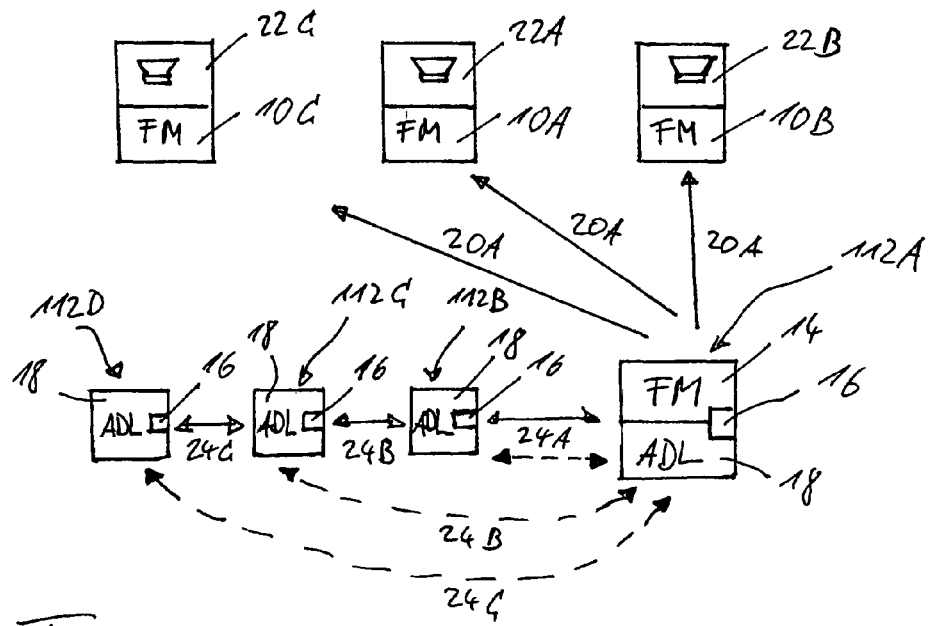
FIG. 7 is a view like FIG. 1, wherein an alternative example of the architecture of a communication system according to the invention is shown.
Figure 8:
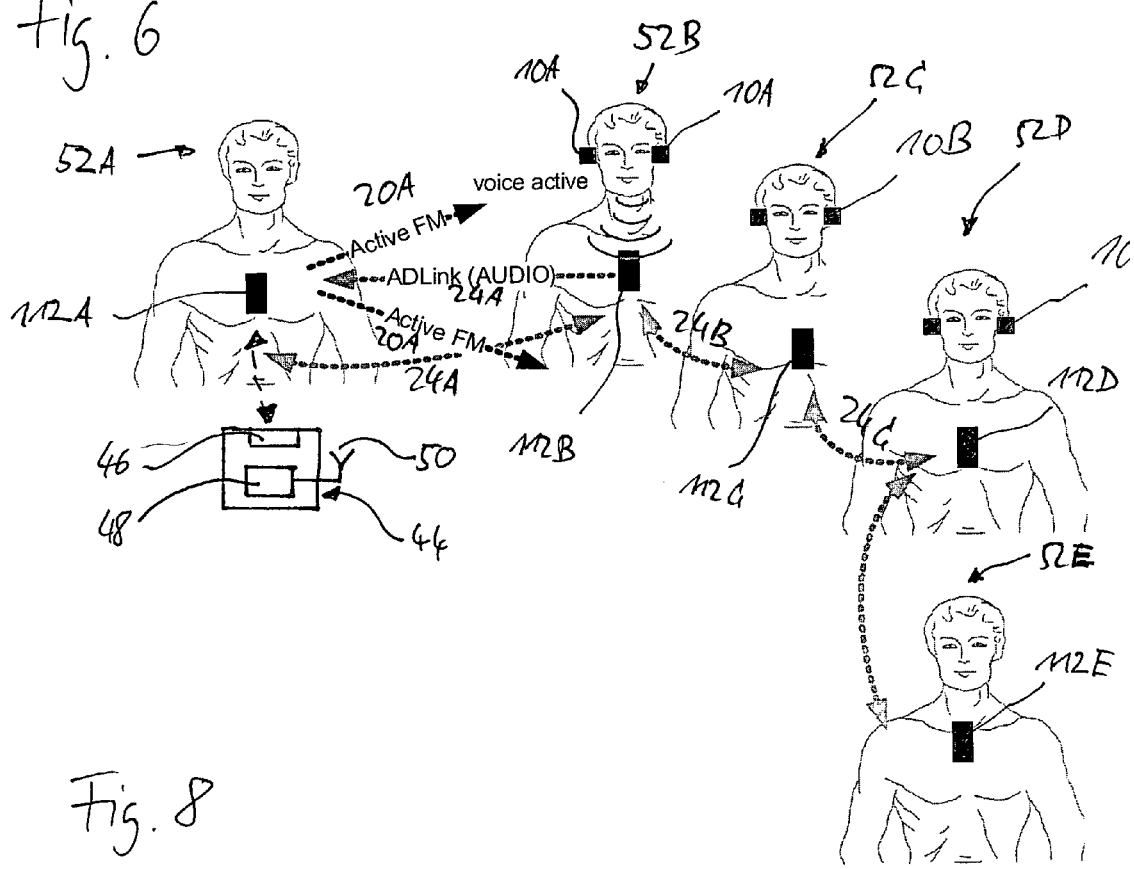
FIG. 8 is a schematic view of an application example of the system of FIG. 7.

In FIG. 8 a modification of the embodiment of FIG. 3 is shown, with the respective basic system architecture being schematically shown in FIG. 7. According to this embodiment, only a few—usually only one—of the transmission units comprises an analog transmission portion 14 and hence is adapted for audio signal transmission via the analog audio link 20A to the receiver units 10A, 10B, 10C, whereas the other transmission units comprise only the digital transceiver portion 18 in order to participate in the digital link, but they do not participate in the analog audio link 20A.

Figure 9:
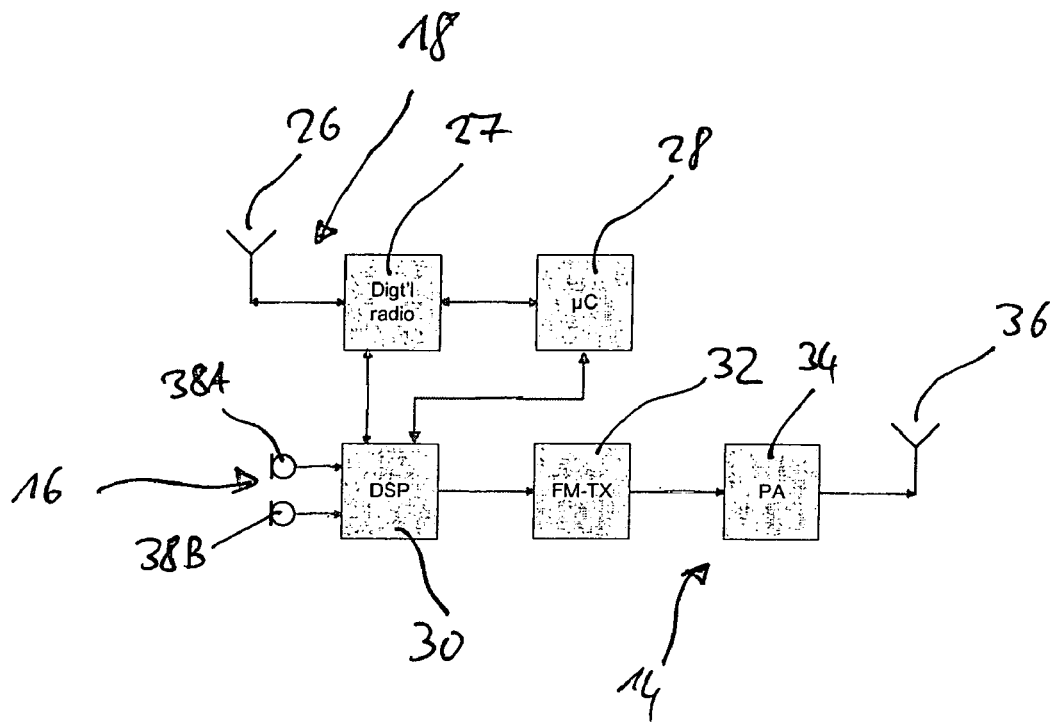
FIG. 9 is a block diagram of an example of one of the transmission units to be used in the system of FIG. 7.

An example of a transmission unit 112A participating in the analog audio link 20A is shown in FIG. 9. Similar to the example of the transmission unit 12A shown in FIG. 4, the transmission unit 112A comprises an antenna 26, a digital transceiver 27, a control unit 28, two spaced apart microphones 38A, 38B, an audio signal processing unit 30, an analog transmitter 32, a power amplifier and an antenna 36.

Figure 10:
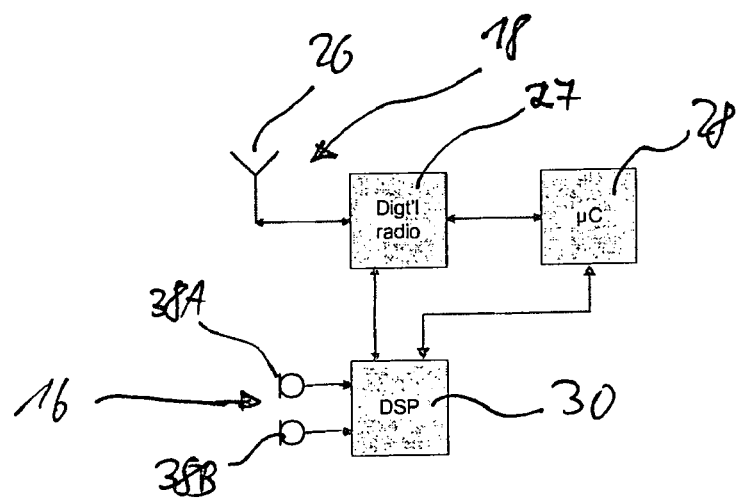
FIG. 10 is a block diagram of an example of another one of the transmission units to be used in the system of FIG. 7.

An example of the digital-only transmission units 112B, 112C, 112D is shown in FIG. 10, according to which an antenna 26, a digital transceiver 18, a control unit 28, an audio signal processing unit 30 and two spaced apart microphones 38A, 38B are provided.

In the system of FIGS. 7 to 10 the digital link ("ADL") is provided with a communication protocol which allows not only the exchange of control data between the transmission units, which are necessary for organizing the "right to transmit", but in addition allows to digitally transmit audio data corresponding to the audio signal captured by the microphone arrangement 16 of the digital-only transmission units, after having been processed in the audio signal processing unit 30, via the digital transceiver 18 over the digital link to the other transmission units. Thereby the audio signals captured by each of the digital-only transmission units 112B, 112C, 112D can be transmitted via the digital link to the analog-digital transmission unit 112A, In analogy to FIGS. 1, 5 and 6, each digital-only transmission unit may communicate directly with the analog-digital transmission unit 112A, or communication may occur indirectly via the closest one of the other digital-only transmission units.

The digital audio signals received by the digital transceiver portion 18 of the analog-digital transmission unit 112A are supplied to the audio signal processing unit 30 from where they can be transmitted in the same manner as the audio signals captured by the microphones 38A, 38B of the transmission unit 112A via the analog transmitter 32, the power amplifier 34 and the antenna 36 over the analog audio link 20A to the receiver units 10A, 10B, 10C. The control unit 28 of the transmission unit 112A decides whether the audio signal is received via the digital link from one of the digital-only transmission units is allowed to be transmitted via the analog audio link 20A or not. In this respect it is conceivable that transmission of the digital audio data via the digital link is not controlled by the analog-digital transmission unit 112A, but the analog-digital transmission unit 112A then will decide which of the received audio signal data is to be transmitted via the analog audio link 20A. It is further possible to mix two or more audio streams transmitted via digital links 24A, 24B, 24C in the analog-digital transmission unit 112A before transmission over the analog link 20A. Alternatively, the signals picked up by microphone arrangement 16 of transmission unit 112A can be mixed with two or more audio streams transmitted via digital links 24A, 24B, 24C in the analog-digital transmission unit 112A before transmission over the analog link 20A. According to an alternative model, the digital-only transmission units are allowed to transmit digital audio data to the analog-digital transmission unit 112A only if having been allowed by the analog-digital transmission unit 112A to do so.

The priority handling may be the same as discussed for the embodiment of FIGS. 1 to 6. Preferably, the analog-digital transmission unit 112A will be the master, whereas the digital-only transmission units 112B, 112C, 112D will be the slaves.

FIG. 8 shows an example wherein the system architecture of FIG. 7 is applied to the application shown in FIG. 3. In the embodiment of FIG. 8 the teacher 52A is transmitting his voice in the same manner to the receiver units 10A, 10B, 10C of the hearing impaired students 52B, 52C, 52D as in the example of FIG. 3. However, the students' answers first are transmitted in digital form via the digital link to the teacher's transmission unit 112A, from where they are transmitted, if the respective student's transmission unit 112B has been awarded the "right to transmit" by the control unit 28 of the teacher's transmission unit 112A, is transmitted via the analog audio link 20A to the receiver units 10A, 10B and 10C (in FIG. 8 the student 52B is speaking). Thereby the teacher's transmission unit 112A is used as a "hub".

According to a modification of the embodiment of FIG. 3 and the embodiment of FIG. 8 a second teacher may be provided with a respective transmission unit so that he will also be able to transmit his voice via the analog audio link. Priority handling between the transmission units of the two teachers may be the same as discussed, for example, with regard to FIG. 2, i.e. there may be a "first come" principle or one of the teachers may have higher priority.

As described in detail above, the digital link may be utilized for controlling the "right to transmit" via the analog audio link (FIGS. 1 to 6) and in addition it may be used for transmitting audio signals digitally to a "analog audio transmission hub" (FIGS. 7 to 10). However, in addition a digital link also may be used for other purposes, such as bidirectional status reading of the various transmission units (for example, battery power, etc.), software upgrade for the transmission units, remote control functionality, distribution of extracted audio data and distance estimation between two transmission units, for example, via RSSI functions (for example, the distance between a teacher and a student may be estimated), which may help, for example, with paring functions.

The transmission units worn by hearing impaired users may serve as a remote control for the respective receiver unit, for example via a 41 kHz link. This is particularly beneficial for controlling the FM receiver channel. Thereby the FM frequency management could be simplified. For example, if a certain FM channel is found to be disturbed, a new one could be found and all FM receivers and FM transmitters could be switched to this new channel. Communication regarding the FM frequency between the FM transmitters would be achieved via the digital link.

In some modified embodiments the analog audio link 20A, 20B, 20C, 20D may be replaced by a corresponding digital audio link.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A method of operating a communication system comprising at least one receiver unit worn by a user and a plurality of transmission units each worn by a user and comprising a microphone arrangement, an audio signal transmission portion, an assistive digital link transceiver portion and a control unit, said method comprising:

establishing a bidirectional assistive digital link from each transmission unit to at least one of the other transmission units and/or to an external command unit;

capturing audio signals from the respective user's voice at least one of the transmission units, establishing a wireless audio link to said at least one receiver unit in order to transmit the captured audio signals to said at least one receiver unit, stimulating the hearing of the user(s) of the at least one receiver unit according to the audio signals received by the at least one receiver unit via said audio link, wherein audio signal transmission of each transmission unit is controlled according to data exchanged with the control unit of at least one of the other transmission units and/or the external command unit via the assistive digital link;

wherein audio signal transmission of said transmission units is controlled by communication of the control units via the assistive digital link in such a manner that only one of the transmission units at a time is allowed to transmit audio signals via the audio link;

wherein the communication protocol of the assistive digital link causes one of the control units to be a master and the other control units to be slaves, wherein each of the transmission units comprises a voice activity detector which determines whether the user of the respective transmission unit is presently speaking, and wherein the transmission units are worn around the respective user's neck or on the user's belt.

2. The method of claim 1, wherein the communication protocol of the assistive digital link is such that each slave control unit communicates directly with the master control unit via the assistive digital link.

3. The method of claim 1, wherein the communication protocol of the assistive digital link is such that the slave control units communicate with at least one of the other slave control units via the assistive digital link in such a manner that each of those slave control units which do not directly communicate with the master control unit communicate with the master control unit via at least one of the other slave control units.

4. The method of claim 1, wherein each transmission unit which has detected that the respective user is presently speaking transmits via the assistive digital link a request for being allowed to transmit via the audio link.

5. The method of claim 4, wherein the master control unit decides which one of the control units is allowed to transmit via the audio link and wherein the master control unit transmits via the assistive digital link corresponding commands to the slave control units.

6. The method of claim 1, wherein each transmission unit is awarded a certain priority and wherein a transmission unit whose user is determined to presently speak is allowed to transmit via the audio link only if none of the other transmission units having the same or a higher priority has detected that the user of that respective transmission unit is presently speaking.

7. The method of claim 1, wherein at least one of the transmission units is manually operabled by the respective user for requesting the right to transmit audio signals via the audio link.

8. The method of claim 1, wherein an external command unit comprising an assistive digital link transceiver is provided which is to be manually operated by the user(s) of the at least one receiver unit or by the user of one of the transmission units in order to determine which one of the transmission units is allowed to transmit via the audio link.

9. The method of claim 1, wherein the audio link is an analog audio link.

10. The method of claim 9, wherein the audio link is a frequency modulation link.

11. The method of claim 1, wherein the assistive digital link uses Gaussian frequency-shift keying modulation.

12. The method of claim 1, wherein the assistive digital link uses frequency hopping.

13. The method of claim 1, wherein the assistive digital link uses time division multiple access.

14. The method of claim 1, wherein stimulating means is worn at least in part in the user's ear canal.

15. The method of claim 1, wherein the receiver unit is to be worn at the user's ear or at least in part in the user's ear canal.

16. The method of claim 1, wherein the microphone arrangement comprises two or more spaced apart microphones.

17. The method of claim 1, wherein the system comprises a plurality of receiver units and wherein at least one of the users uses one of the transmission units and one of the receiver units.

18. The method of claim 17, wherein the digital link is used for at least one of: reading of information regarding the status of the transmission units; upgrade of software of the transmission units; estimation of the distance between two of the transmission units; distribution of extracted audio data to the transmission units; and remotely controlling the transmission units.

19. A method of operating a communication system comprising at least one receiver unit worn by a user and a plurality of transmission units each worn by a user and comprising a microphone arrangement and an assistive digital link transceiver portion, wherein at least one of the transmission units comprises an audio signal transmission portion; the method comprising:

capturing audio signals from the respective user's voice at least one of the transmission units, establishing a bidirectional assistive digital link from each transmission unit to at least one of the other transmission units for digitally transmitting audio signals captured by the microphone arrangement of the transmission unit and for exchanging control data with the at least one of the other transmission unit and/or with an external command unit;

establishing a wireless audio link from said at least one least one transmission unit comprising the audio signal transmission portion to said at least one receiver unit in order to selectively transmit audio signals captured the microphone arrangement of that transmission unit and/or audio signals received via the assistive digital link from at least one of the other transmission units to said at least one receiver unit, stimulating the hearing of the user(s) of the at least one receiver unit according to the audio signals received by the at least one receiver unit via the audio link, wherein selection of the audio signals to be transmitted via the audio link occurs according to the data exchanged between the transmission units and/or the external command unit, wherein each transmission unit comprises a control unit which controls assistive digital audio signal transmission of that transmission unit according to control data exchanged with the control unit of said at least one of the other transmission units, wherein the communication protocol of the assistive digital link cause the control unit of the transmission unit comprising the audio signal transmission portion to be a master and the other control units to be slaves, wherein transmission of audio signal via the audio link is controlled by communication of the control units via the assistive digital link in such a manner that only audio signals captured by the microphone arrangement of one of the transmission units at a time are transmitted via the audio link, wherein each of the transmission units comprises a voice activity detector which determines whether the user of the respective transmission unit is presently speaking, and wherein the transmission units are worn around the respective user's neck or on the user's belt.

20. The method of claim 19, wherein the communication protocol of the assistive digital link is such that each slave control unit communicates directly with the master control unit via the assistive digital link.

21. The method of claim 19, wherein the communication protocol of the assistive digital link is such that the slave control units communicate with at least one of the other slave control units via the assistive digital link in such a manner that each those slave control units which do not directly communicate with the master control unit communicate with the master control units via at least one of the other slave control units.

22. The method of claim 19, wherein each transmission unit which has detected that the respective user is presently speaking transmits via the assistive digital data link a request for being allowed to have the audio signals captured by that transmission unit transmitted via the audio link.

23. The method of claim 22, wherein the master control unit decides which one of the control units is allowed to transmit via the audio link and transmits via the assistive digital link corresponding commands to the control units.

24. The method of claim 19, wherein each transmission unit is awarded a certain priority and wherein a transmission unit whose user is determined to presently speak is allowed to transmit via the audio link only if none of the other transmission units having the same or a higher priority has detected that the user of that respective transmission unit is presently speaking, with the transmission unit comprising the audio signal transmission portion being awarded the highest priority.

* * * * *